(12) United States Patent
Lin et al.

(10) Patent No.: US 12,602,450 B2
(45) Date of Patent: Apr. 14, 2026

(54) LEARNING FROM MISTAKES TO IMPROVE DETECTION RATES OF MACHINE LEARNING (ML) MODELS

(71) Applicant: Zscaler, Inc., San Jose, CA (US)

(72) Inventors: Dianhuan Lin, Sunnyvale, CA (US); Miao Zhang, Palo Alto, CA (US); Shaleen Taneja, Faridabad (IN); Rex Shang, Los Altos, CA (US); Howie Xu, Palo Alto, CA (US)

(73) Assignee: Zscaler, Inc., San Jose, CA (US)

( * ) Notice: Subject to any disclaimer, the term of this patent is extended or adjusted under 35 U.S.C. 154(b) by 670 days.

(21) Appl. No.: 18/072,034

(22) Filed: Nov. 30, 2022

(65) Prior Publication Data

US 2024/0119121 A1     Apr. 11, 2024

Related U.S. Application Data

(63) Continuation of application No. 17/961,072, filed on Oct. 6, 2022.

(30) Foreign Application Priority Data

Oct. 10, 2022     (IN) .............................. 202211057867

(51) Int. Cl.
*G06F 18/21*          (2023.01)
*G06N 20/00*          (2019.01)
(52) U.S. Cl.
CPC ........... *G06F 18/217* (2023.01); *G06N 20/00* (2019.01)

(58) Field of Classification Search
None
See application file for complete search history.

(56) References Cited

U.S. PATENT DOCUMENTS

| | | |
|---|---|---|
| 6,009,475 A | 12/1999 | Shrader |
| 6,138,162 A | 10/2000 | Pistriotto et al. |
| 7,316,029 B1 | 1/2008 | Parker et al. |
| 7,383,569 B1 | 6/2008 | Elgressy et al. |
| 7,620,985 B1 | 11/2009 | Bush et al. |
| 8,166,533 B2 | 4/2012 | Yuan |
| 8,499,348 B1 | 7/2013 | Rubin |
| 8,677,471 B2 | 3/2014 | Karels et al. |
| (Continued) | | |

FOREIGN PATENT DOCUMENTS

| | | |
|---|---|---|
| WO | 2018152303 A1 | 8/2018 |

OTHER PUBLICATIONS

Jordaney, Roberto, et al., "Transcend: Detecting concept drift in malware classification models," 26th {USENIX} Security Symposium ({USENIX} Security 17), 2017.

(Continued)

*Primary Examiner* — Raqiul A Choudhury
(74) *Attorney, Agent, or Firm* — Baratta Law PLLC; Lawrence A. Baratta, Jr.

(57)          ABSTRACT

Systems and methods for learning from mistakes to improve detection rates of Machine Learning (ML) models. The systems and methods including receiving data with labels; running the data through a trained ML model for predictions; identifying errors in the predictions based on the labels received with the data; adjusting weights associated with samples in the data based on the identified errors; and retraining the ML model with the adjusted weights.

20 Claims, 10 Drawing Sheets

(56)                References Cited

U.S. PATENT DOCUMENTS

| | | | |
|---|---|---|---|
| 9,065,850 | B1 | 6/2015 | Sobrier |
| 9,152,789 | B2 | 10/2015 | Natarajan et al. |
| 9,773,107 | B2 | 9/2017 | White et al. |
| 10,142,362 | B2 | 11/2018 | Weith et al. |
| 10,154,067 | B2 | 12/2018 | Smith et al. |
| 10,348,599 | B2 | 7/2019 | O'Neil et al. |
| 10,362,048 | B2 | 7/2019 | Alexander et al. |
| 10,419,477 | B2 | 9/2019 | Desai et al. |
| 10,439,985 | B2 | 10/2019 | D'Neil |
| 10,498,605 | B2 | 12/2019 | Weith et al. |
| 10,505,899 | B1 | 12/2019 | Singh et al. |
| 2005/0193222 | A1 | 9/2005 | Greene |
| 2006/0095970 | A1 | 5/2006 | Rajagopal et al. |
| 2007/0233477 | A1 | 10/2007 | Halowani et al. |
| 2010/0115621 | A1 | 5/2010 | Staniford et al. |
| 2016/0162802 | A1* | 6/2016 | Chickering ............ G06N 20/00 |
| | | | 706/12 |
| 2016/0344770 | A1 | 11/2016 | Verma et al. |
| 2017/0063886 | A1 | 3/2017 | Muddu et al. |
| 2017/0078329 | A1 | 3/2017 | Hwang et al. |
| 2017/0272465 | A1 | 9/2017 | Steele |
| 2018/0041471 | A1 | 2/2018 | Sudo et al. |
| 2018/0150758 | A1 | 5/2018 | Niininen et al. |
| 2018/0174275 | A1* | 6/2018 | Bourdev .......... G06V 30/19147 |
| 2018/0293381 | A1 | 10/2018 | Tseng et al. |
| 2019/0281073 | A1 | 9/2019 | Weith et al. |
| 2019/0319972 | A1 | 10/2019 | Desai |
| 2019/0349283 | A1 | 11/2019 | O'Neil et al. |
| 2020/0021618 | A1 | 1/2020 | Smith et al. |
| 2021/0146241 | A1* | 5/2021 | Bleasdale-Shepherd .................... |
| | | | A63F 13/86 |
| 2021/0326698 | A1* | 10/2021 | Bukharev .............. G06N 3/063 |
| 2022/0036208 | A1* | 2/2022 | Rao ........................ H04L 63/145 |
| 2023/0032822 | A1* | 2/2023 | Wang .................... G06N 20/20 |
| 2023/0251856 | A1* | 8/2023 | Ni ......................... G06N 3/0464 |
| | | | 717/120 |
| 2023/0259883 | A1* | 8/2023 | Misler .................... G06N 5/022 |
| | | | 705/321 |

OTHER PUBLICATIONS

Kantchelian, Alex, J. D. Tygar, and Anthony Joseph, "Evasion and hardening of tree ensemble classifiers," International Conference on Machine Learning, 2016.

Tolomei, Gabriele, et al., "Interpretable predictions of tree-based ensembles via actionable feature tweaking," Proceedings of the 23rd ACM SIGKDD International Conference on Knowledge Discovery and Data Mining. ACM, 2017.

Aug. 13, 2019, International Preliminary Report on Patentability and Written Opinion for International Application No. PCT/US2018/015902.

Aug. 20, 2019, International Preliminary Report on Patentability and Written Opinion for International Application No. PCT/US2018/018325.

* cited by examiner

900

902

Receiving data with labels

904

Running the data through a trained Machine Learning (ML) model for predictions

906

Identifying errors in the predictions based on the labels received with the data

908

Adjusting weights associated with samples in the data based on the errors

910

Retraining the ML model with the adjusted weights

LEARNING FROM MISTAKES TO IMPROVE DETECTION RATES OF MACHINE LEARNING (ML) MODELS

FIELD OF THE DISCLOSURE

The present disclosure generally relates to computer networking systems and methods. More particularly, the present disclosure relates to systems and methods for identifying incorrect labels and improving label correction for Machine Learning (ML) for security, and for learning from mistakes to improve detection rates of ML models.

BACKGROUND OF THE DISCLOSURE

Malware Machine Learning (ML) model development relies on the accuracy of sandbox malicious labels, where mislabeled files can cause problems in model training and evaluation. Traditionally, research teams must manually view all sandbox malicious files to identify mislabeled files (i.e., false positives and false negatives). Due to the large number of files, manual verification is unlikely to uncover all mislabeled files. With mislabeled files flowing into test data, it will artificially increase false negative numbers in the ML model. The present disclosure provides a novel way to rapidly scan all mislabeled files by grouping them into sub-groups and intelligently collecting samples for human review.

ML techniques are proliferating and offer many use cases. In network and computer security, there are various use cases for machine learning, such as malware detection, identifying malicious files for further processing such as in a sandbox, user risk determination, content classification, intrusion detection, phishing detection, etc. The general process includes training where a machine learning model is trained on a dataset, e.g., data including malicious and benign content or files, and, once trained, the machine learning model is used in production to classify unknown content based on the training. One prevalent approach is to avoid using knowledge features but leverage non-knowledge features such as using n-gram of executable files, using image structure after converting executable files into images, etc. This approach theoretically can produce a good result. However, this approach requires a large training dataset and a long training cycle, leading to a high cost. The high cost is associated with training, optimizing, and updating the machine learning model. This leads to challenges to deliver trained machine learning models for production. A long training time either requires a very long optimization process for good results or a relatively short optimization process for suboptimal results. In fact, the conventional approach can require training times in days, which means updating the machine learning model takes a significant amount of time and effort, resulting in a low agility.

Also, the traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

The cloud services can be combined with machine learning both in training and production. Specifically, training requires a large data set with labels for training a machine learning model. One advantage of the cloud service is its access to a large data set which can be monitored, labeled, and used for training machine learning models. Once a model is trained, it can be used in production, e.g., for identifying malware, detecting improper activity, and the like.

BRIEF SUMMARY OF THE DISCLOSURE

In an embodiment, a method, a cloud-based system, and a non-transitory computer-readable medium include steps for identifying incorrect labels in datasets. The incorrect label identification steps include receiving data with labels; training one or more Machine Learning (ML) models to label the received data; identifying disagreements between the labels provided by the one or more ML models and the labels received with the data; and providing one or more groups of the data for review for incorrect labels.

The steps further include the one or more groups of data provided for review include one or more files from the received data which have labels that disagree with the labels provided by an ML model. In embodiments, a plurality of ML models disagree about labels for one or more files in the received data, wherein the one or more groups of data provided for review include the one or more files. One or more sub-groups are provided for review, wherein the one or more sub-groups include files from the one or more groups of the data. The groups and sub-groups are provided based on one of URL domain and similarity. Different ML models can be used to provide the groups and the sub-groups. ML models which provide the groups of the data can be trained using supervised learning and ML models which provide the sub-groups can be trained using unsupervised learning.

In an embodiment, a method, a cloud-based system, and a non-transitory computer-readable medium include steps for learning from mistakes to improve detection rates of Machine Learning (ML) models. The steps include receiving data with labels; running the data through a trained Machine Learning (ML) model for predictions; identifying errors in the predictions based on the labels received with the data; adjusting weights associated with the data based on the errors; and retraining the ML model with the adjusted weights.

The steps can further include upsampling the data. The ML model can be adapted to detect malware in the received data. The labels received with the data can identify the samples in the data as malicious or benign. The received data can include fixed weights associated with samples in the data. The errors identified in the predictions can include false positives and false negatives. The received data can include highly imbalanced data. Higher weights can be added to samples in the data with prediction errors. Error analysis can be performed to figure out the root cause of the identified errors.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 4 is a block diagram of a user device, which may be used with the cloud-based system or the like.

DETAILED DESCRIPTION OF THE DISCLOSURE

Example Cloud-Based System Architecture

Figure 1A:
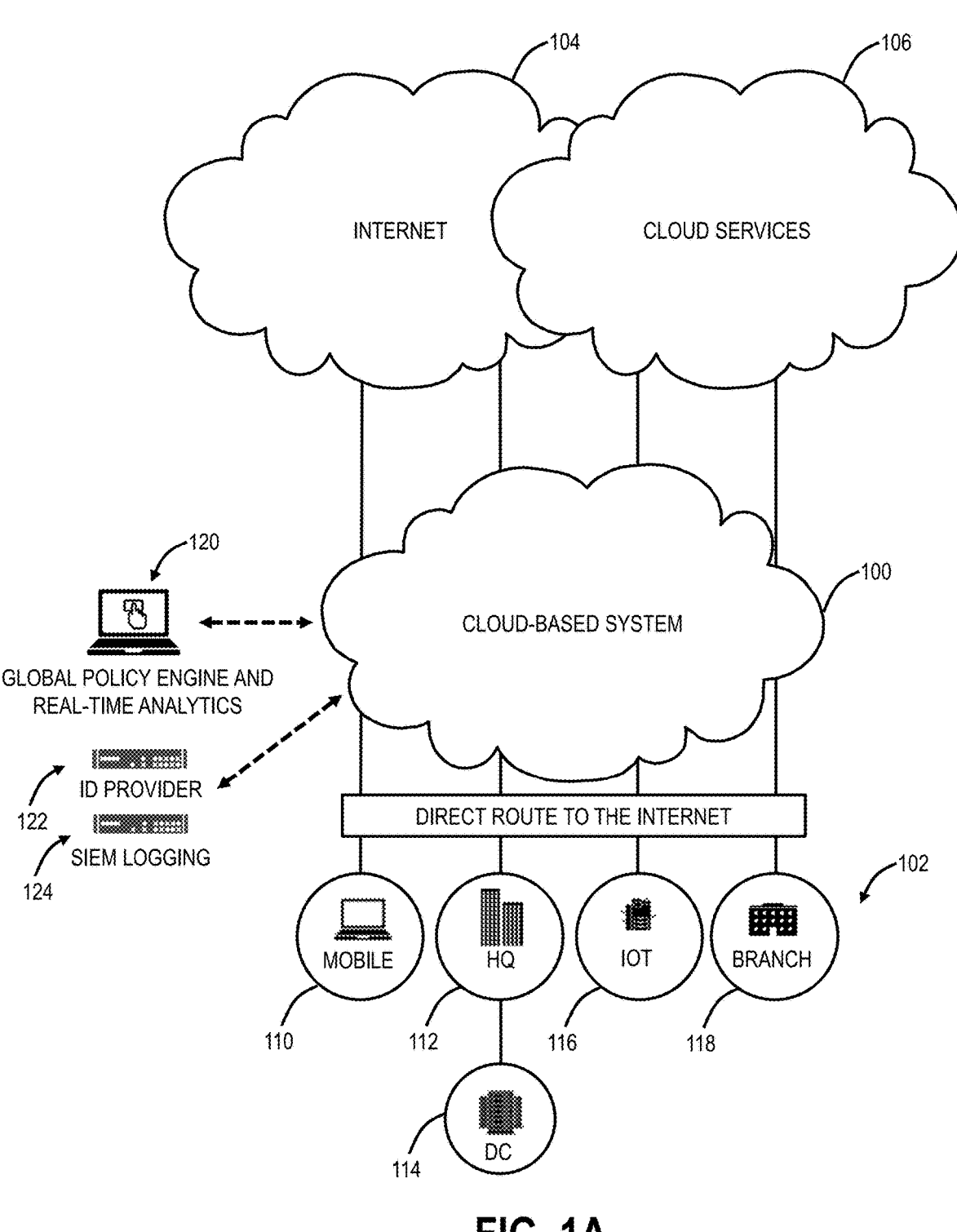
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
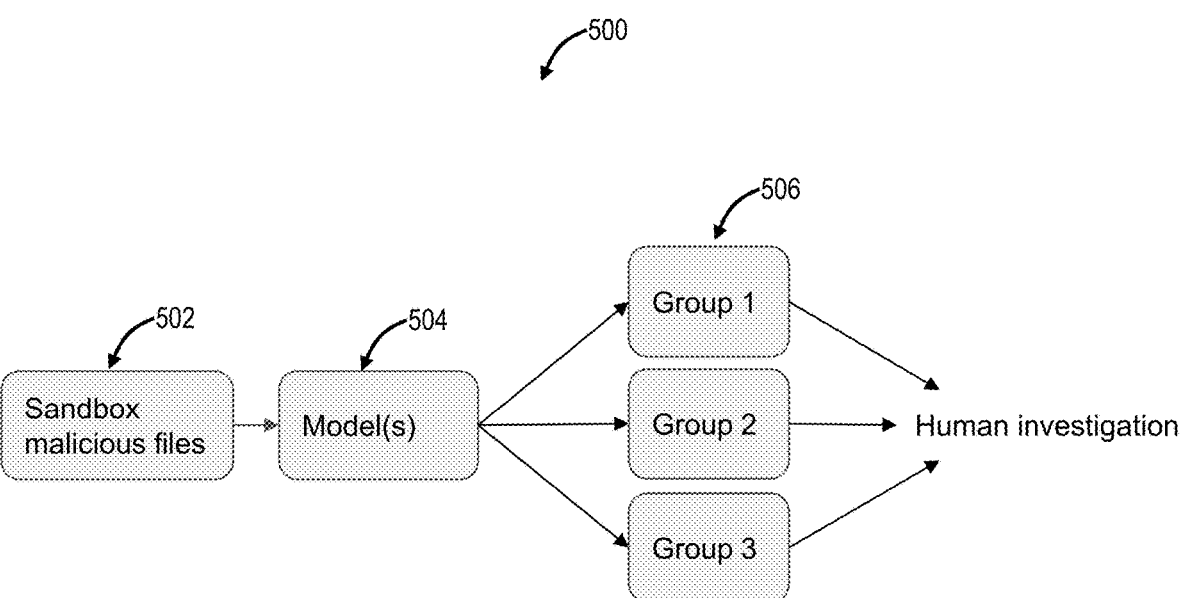
FIG. 5 is a flow diagram of an embodiment of the incorrect label identification workflow of the present disclosure.

For illustration purposes, the users 102 of the cloud-based system 100 can include a mobile device 110, a headquarters (HQ) 112 which can include or connect to a data center (DC) 114, Internet of Things (IOT) devices 116, a branch office/ remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes— they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

Figure 1B:
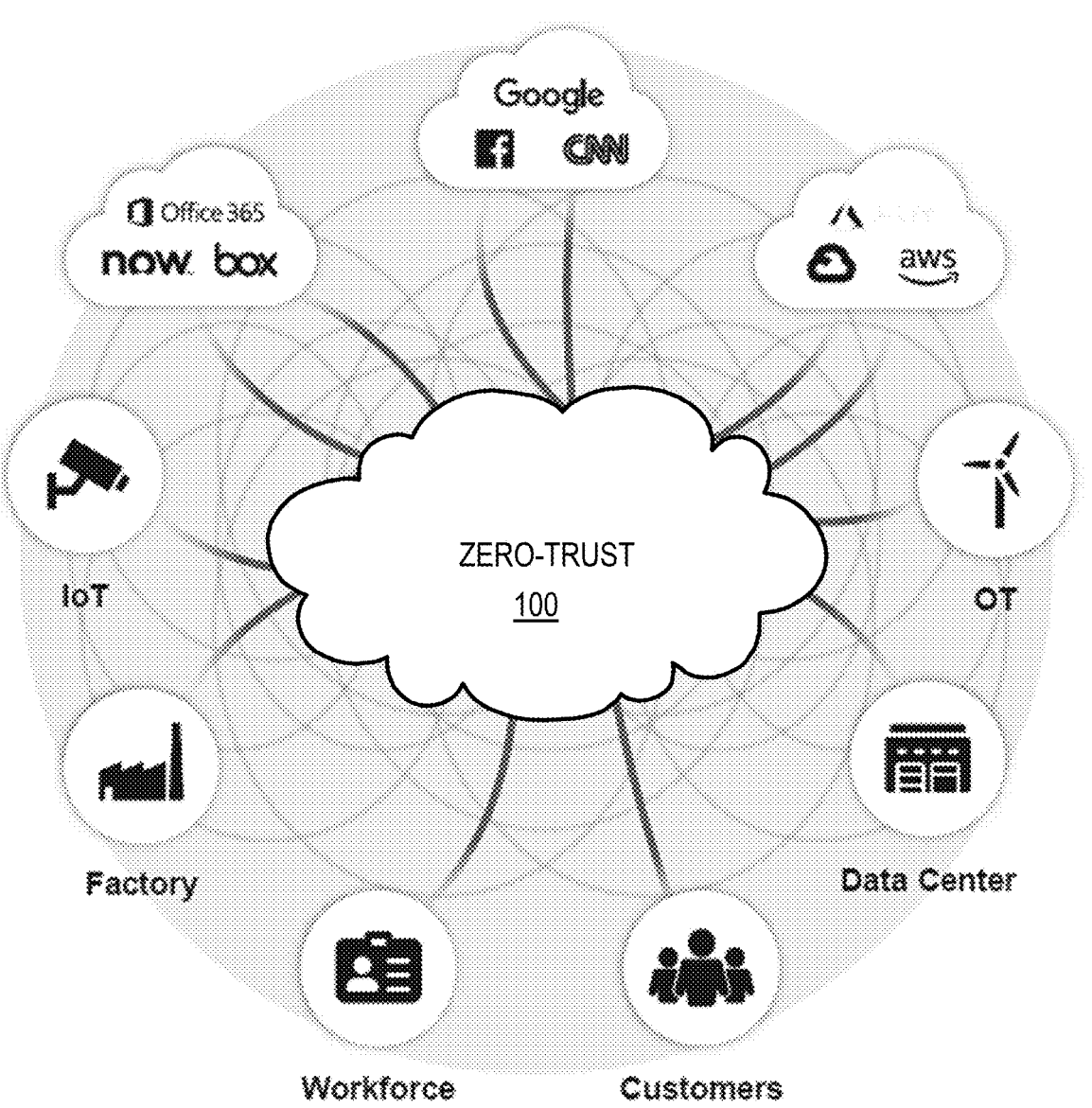
FIG. 1B is a logical diagram of the cloud-based system operating as a zero-trust platform.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.
Zero Trust FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time— before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
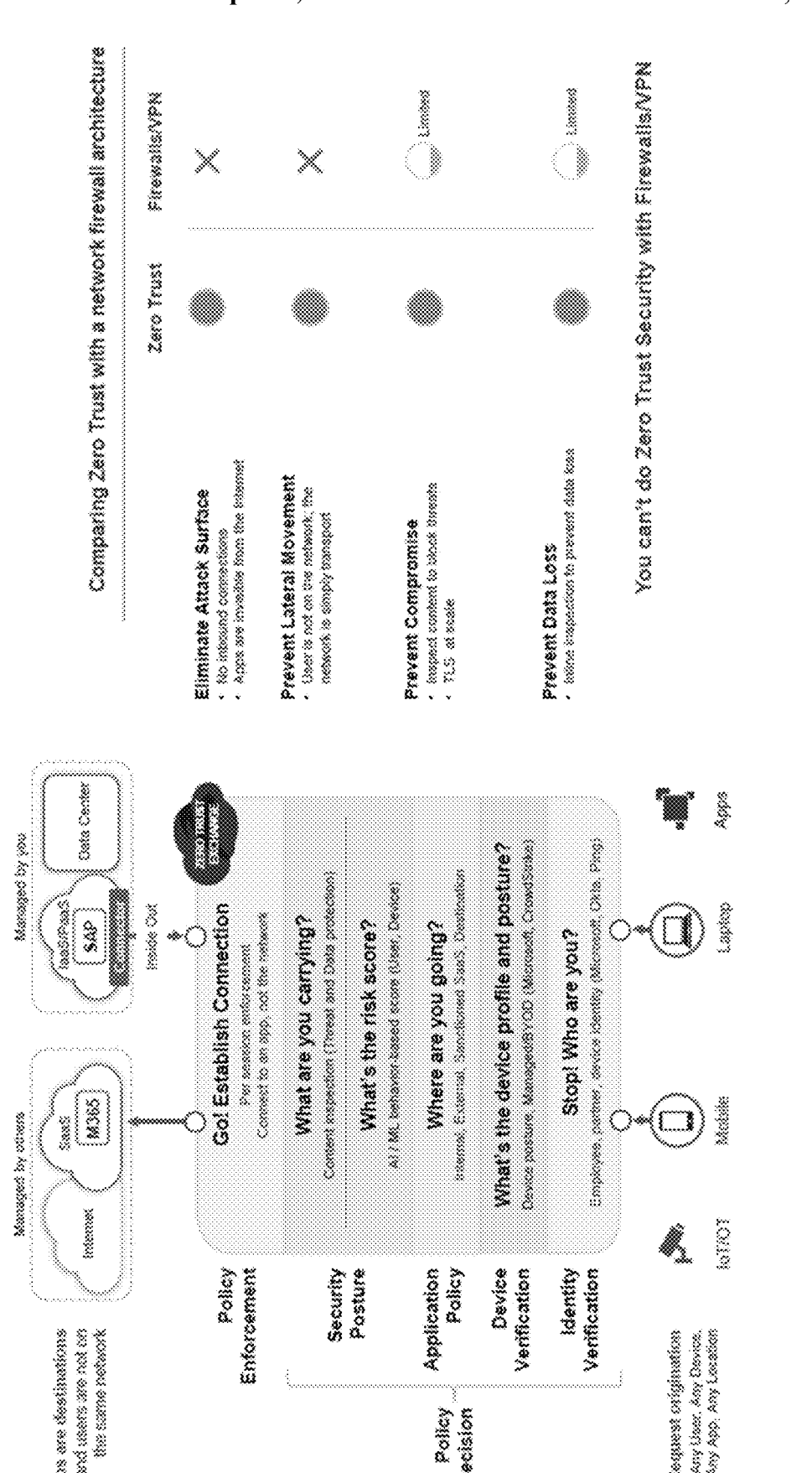
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
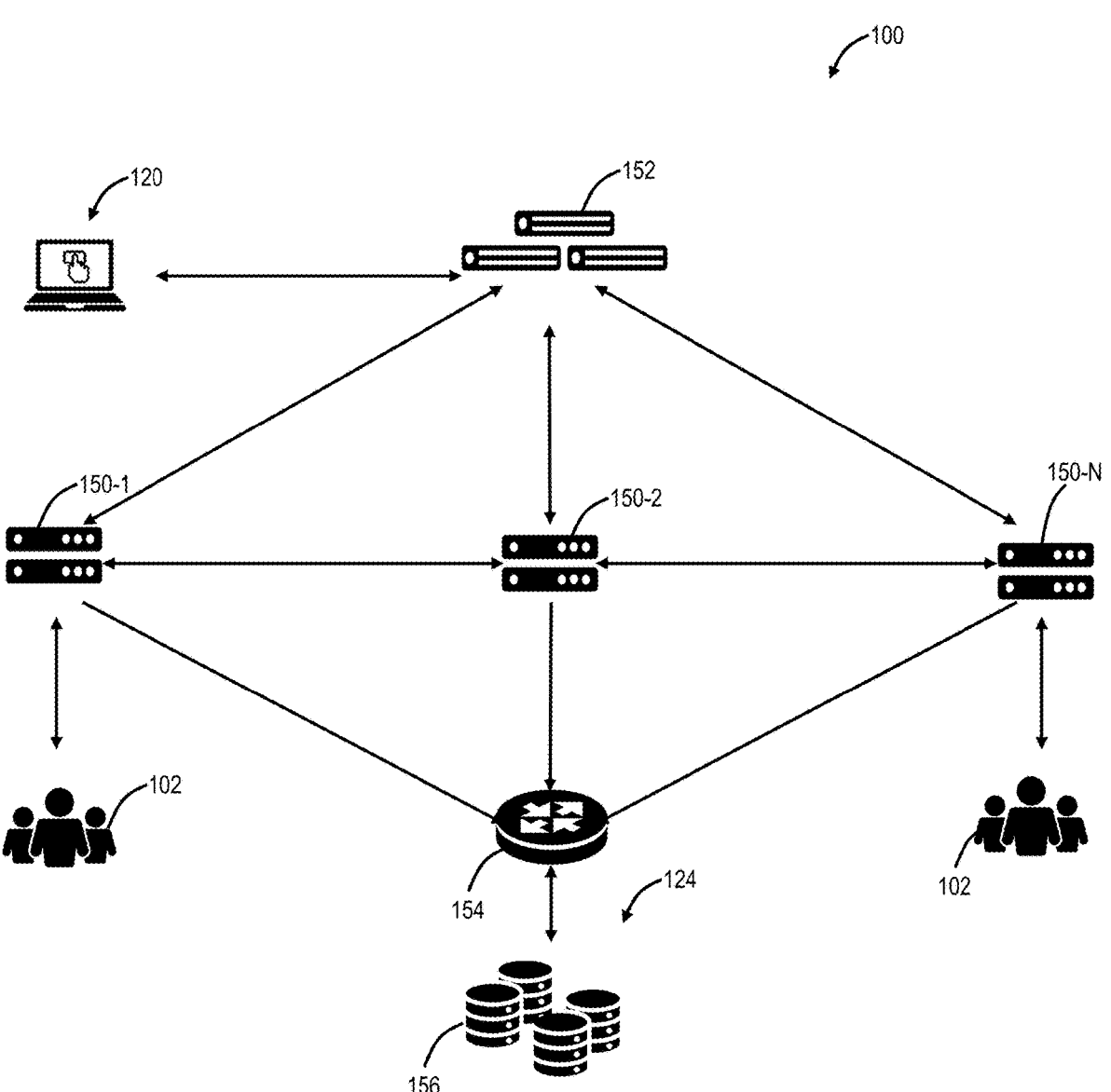
FIG. 2 is a network diagram of an example implementation of the cloud-based system.
Figure 4:
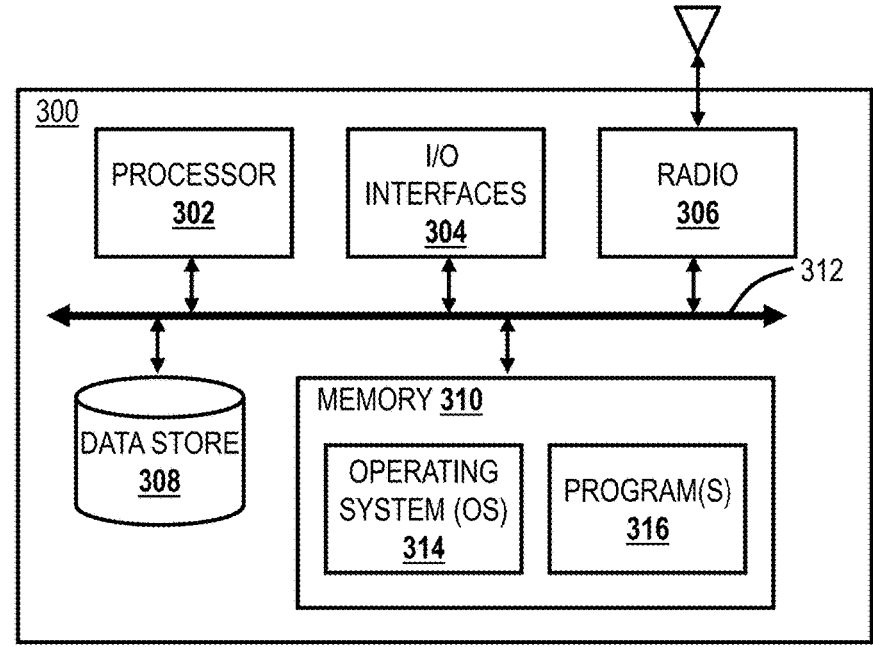

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
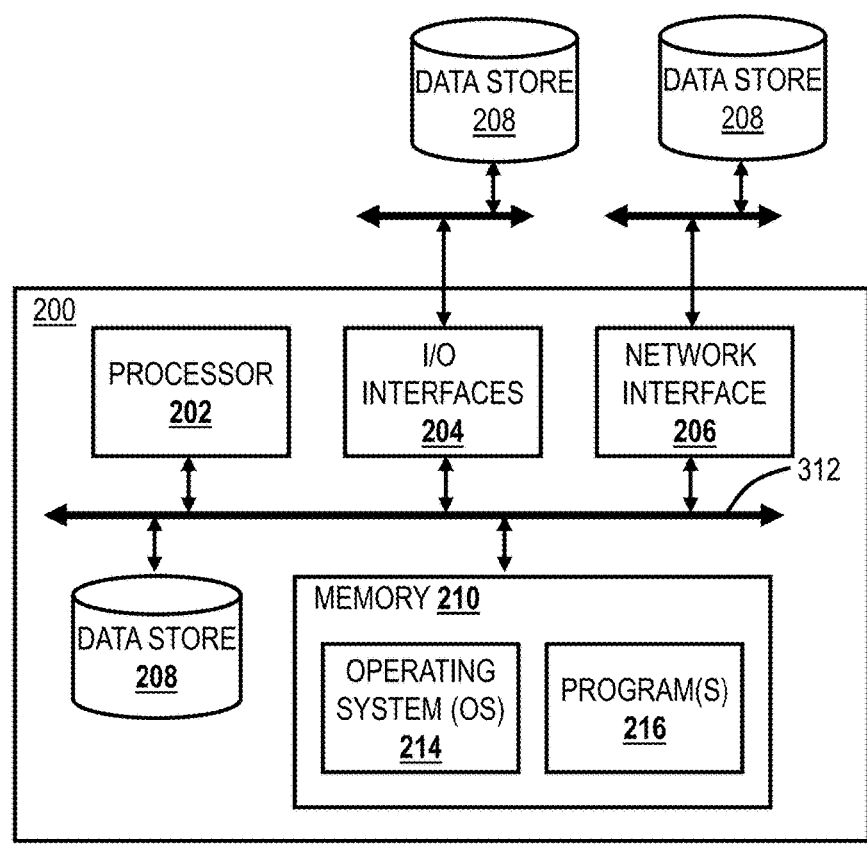
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Machine Learning in Network Security

Machine learning can be used in various applications, including malware detection, intrusion detection, threat classification, the user or content risk, detecting malicious clients or bots, etc. In a particular use case in the present disclosure, machine learning can be used on an Office document, e.g., a file, detected during inline monitoring in the cloud-based system 100, to detect malware therein. That is, a machine learning model is built and trained as described herein to detect malicious Office documents. It follows that the machine learning predictions require high precision due to the impact of a false prediction, i.e., finding a malicious file to be benign.

A description utilizing machine learning in the context of malware detection is described in commonly-assigned U.S. patent application Ser. No. 15/946,546, filed Apr. 5, 2018, and entitled "System and method for malware detection on a per packet basis," the content of which is incorporated by reference herein. As described here, the typical machine learning training process collects millions of malware samples, extracts a set of features from these samples, and feeds the features into a machine learning model to determine patterns in the data. The output of this training process is a machine learning model that can predict whether a file that has not been seen before is malicious or not.

Incorrect Label Identification

Again, Machine Learning (ML) model development for identifying malware relies on the accuracy of sandboxed malicious labels, where mislabeled files can cause problems in model training and evaluation. Traditionally, research teams must manually view all sandbox malicious files to identify mislabeled files (i.e., false positives and false negatives). Due to the large number of files, manual verification is unlikely to uncover all mislabeled files. With mislabeled files flowing into test data, it will artificially increase false negative numbers in the ML model.

The present disclosure provides a novel way to rapidly scan all mislabeled files by grouping them into groups and sub-groups and intelligently collecting samples for human review, the samples being the groups and sub-groups. The present systems and methods replace the need for humans to review all files, which is impractical due to the number of files which humans do not have the capacity to review.

In various embodiments, the systems and methods include training one or more ML models. The training of multiple ML models can include training with different subsets of features, different subsets of examples, and different example weighting to provide a wider range of identification and diversity in model development. The data used to train the one or more models includes data with labels, where the labels can be either human labeled or received from one or more threat intelligence datasets. The models can be trained utilizing supervised learning, and unsupervised learning, in addition to combinations thereof.

In an embodiment, the systems and methods include training one ML model to be used to determine mislabeled data. The systems and methods further include receiving data with labels (some of the labels are incorrect), and running the received data through the ML model for predictions. The ML model will identify disagreements between the received data (i.e., identify disagreements with the labels). The systems and methods further output a set or multiple sets (groups and sub-groups) of data for further review. Again, the ML model identifies disagreements and provides one or more groups of data for further review, rather than requiring humans to review data sets which they do not have the capacity to review.

In other embodiments the systems and methods include training a plurality of ML models to be used to determine mislabeled data. The systems and methods further include receiving data with labels (some of the labels are incorrect), and running the received data through the plurality of ML models for predictions. The plurality of ML models will provide their own labels to the data and identify disagreements between the received data and the other ML models which were used (i.e., identify disagreements with the labels). A priority to review can be assigned to data, where a high priority can be assigned to data which requires review due to disagreements. A high priority can be assigned to data when the ML models agree with each other but disagree with the received date. Similarly, a high priority can be assigned to data when the ML models disagree in addition to disagreeing with the received data (i.e., disagreeing with the labels assigned to the data). Again, the ML models identify disagreements and provide one or more subsets of data for further review.

In various embodiments, multiple ML models are trained using any of supervised learning, and unsupervised learning. Then using active learning to identify a set of examples to be re-labelled. When there is a disagreement between models for one or more labels, they are ordered by the degree of difference. For a supervised learning classification model, the degree of difference is measured by predicted probabilities. For a supervised learning regression model, the degree of difference is measured by predicted values. This provides an output of a set of examples which are highly likely incorrect (incorrect labels from the original data).

FIG. 5 is a flow diagram of an embodiment of the incorrect label identification workflow 500 of the present disclosure. The workflow 500 includes a sandbox of files 502. The sandbox of files 502 can again include data with labels, where the labels can be either human labeled or received from one or more threat intelligence datasets. The workflow includes models 504 which can be the one or more ML models trained for labeling data and identifying mislabeled data as described herein. The one or more models 504 receive the data from the sandbox of files 502 and one or more groups 506 (or sub-groups) are defined for further review. Again, the one or more groups 506 can be created based on a priority which can be assigned to data, where a high priority can be assigned to data which requires review due to disagreements between a model 504 and the malicious file labels. Priority can also be assigned to data when the ML models 504 agree with each other but disagree with the received data. Similarly, a priority can be assigned to data when the ML models disagree in addition to disagreeing with the received data.

Figure 6:
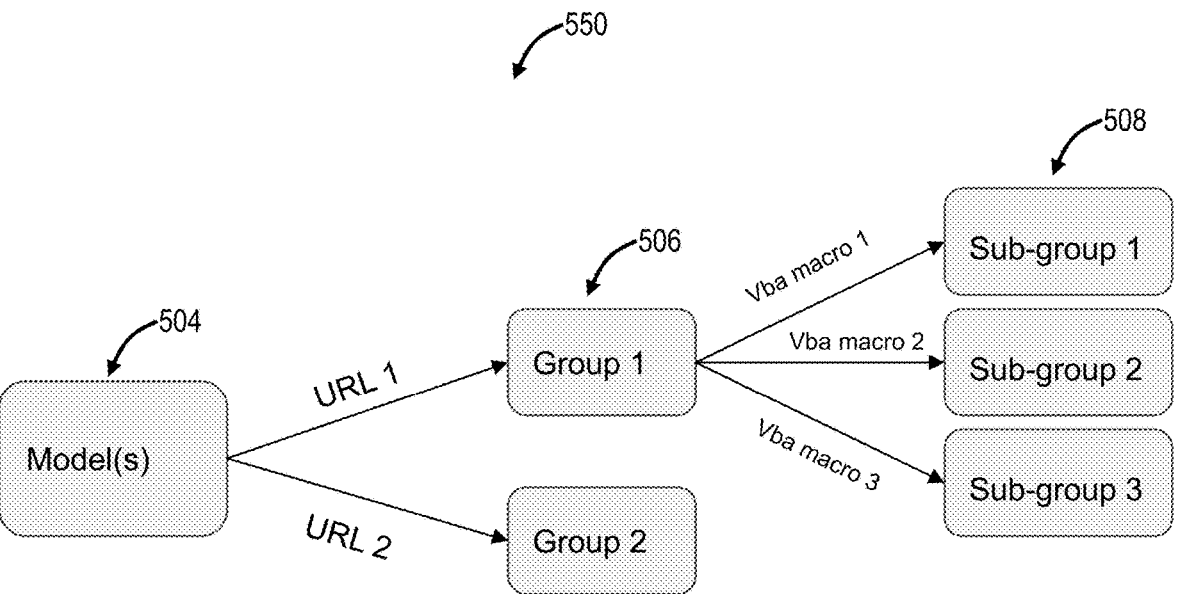
FIG. 6 is a flow diagram of an embodiment of the incorrect label identification workflow of the present disclosure.

FIG. 6 is a flow diagram of an embodiment of the incorrect label identification workflow 550 of the present disclosure. FIG. 6 shows how the groups provided by the present systems and methods can be further grouped into sub-groups 508. FIG. 6 shows one specific example where files are split into groups 506 based on given URL domain. Within each sub-group 508, embodiments can de-duplicate files based on unzipped file names to further reduce the group size. In various embodiments, the sub-groups can be further split into smaller groups based on similarity (for example, similarity of VBA macro modules).

It will be appreciated that in various embodiments, the received data (sandbox of files 502) can include data received by different threat intelligence companies in addition to data monitored by the systems of the present disclosure (i.e., the cloud-based system 100), data labeled by humans, and any other data including one or more labels.

Various embodiments use supervised learning to train the models and then use active learning to create the first sub-set (group). Afterwards unsupervised learning to train models which create further sub-groups.

Various embodiments further include building a reference database to find more incorrect sample which may not be in the initial data set. The systems and methods can further include adding verification to a set as a reference, comparing new models to see any similarities with known occurrences (incorrect label, false positives, false negatives, etc.), and in the case of a new model showing similarity with a known incorrect label, claiming it as the same incorrect label.

Figure 7:
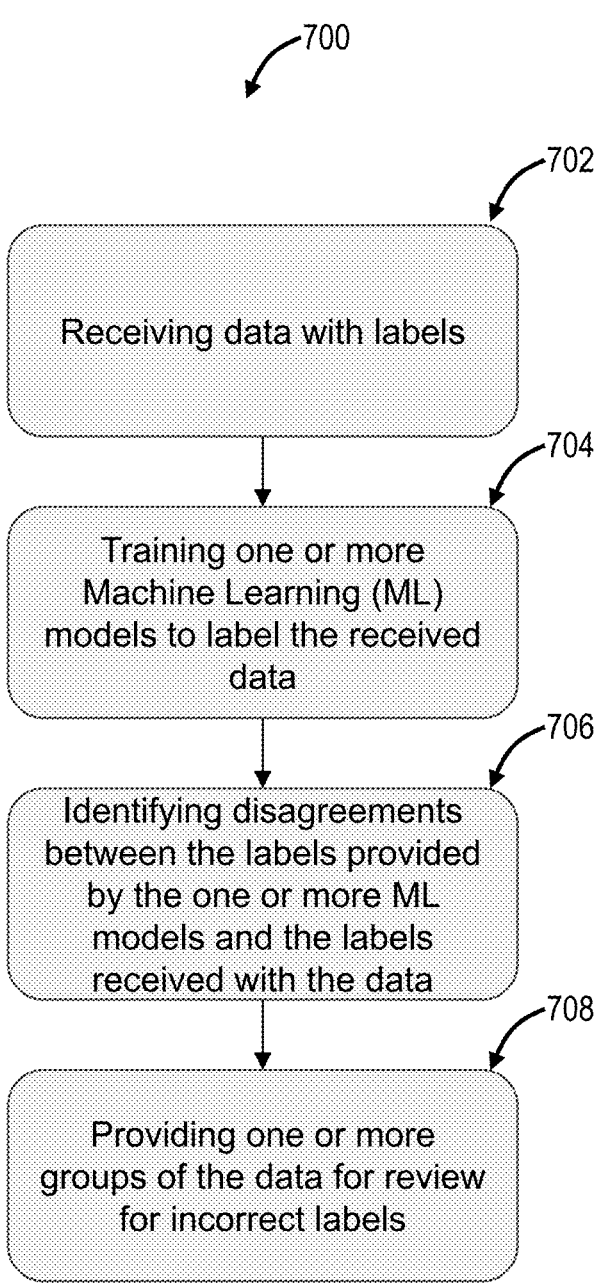
FIG. 7 is a flowchart of a process 700 for identifying incorrect labels in data.

FIG. 7 is a flowchart of a process 700 for identifying incorrect labels in data. The incorrect label identification process 700 can be performed through the cloud-based system 100. Also, the incorrect label identification process 700 can be a computer-implemented method and as instructions stored in a non-transitory computer readable medium. The incorrect label identification process 700 includes receiving data with labels (step 702); training one or more Machine Learning (ML) models to label the received data (step 704); identifying disagreements between the labels provided by the one or more ML models and the labels received with the data (step 706); and providing one or more groups of the data for review for incorrect labels.

The incorrect label identification process 700 can further include assigning a priority to review to a group based on labels provided by the one or more ML models disagreeing with the labels the data was received with. The identifying can include any of an ML model disagreeing with the received data, a plurality of ML models agreeing but disagreeing with the received data, and a plurality of ML models disagreeing while also disagreeing with the received data. The agreeing and disagreeing being between the labels provided by the one or more ML models and the labels received with the data.

The incorrect label identification process 700 can further include providing a plurality of groups of the received data, and providing further sub-groups of the groups for review. The groups and sub-groups can be provided based on URL domain and similarity. Different ML models can be used to provide the first groups and the sub-groups. ML models which create the first group of the data can be trained using supervised learning and then use active learning to identify a group of examples to be re-labelled while ML models which create sub-groups can be trained using unsupervised learning.

Learning from Mistakes various strategies to efficiently improve an ML model to its target precision and recall (detection rate) are contemplated herein. The strategies not only reduce the uncertainty whether the target precision and recall are achievable, but also significantly shorten the path to achieve the goal. The strategies not only work for malware detection, but also succeed in challenging tasks like detecting Cobalt Strike beaconing despite the fact that Cobalt Strike's malleable C2 Profiles make it difficult to detect.

Various embodiments propose "learning from mistakes". Specifically, strategies first pay attention to the prediction errors made by a ML model, such as false positives and false negatives. Strategies further include performing error analysis to figure out the root causes of the errors. After knowing the major root causes, it is possible to work backwards from the goal, and find solutions targeted at reducing the corresponding errors. Some typical root causes of prediction errors and their corresponding efficient and effective solutions are described below.

Incorrect labels, which is a more severe issue in cyber security, can be a significant threat. Since labeling in cyber security typically requires domain knowledge, there is often delay in threat detection (e.g. domains used in attacks can be mistaken as benign before they are detected). The active learning approach proposed herein allows to efficiently discover a majority of labeling errors. Additionally, insufficient features to distinguish positive from negative can cause problems when labeling data. Adding additional features targeted at the errors helps further train models to correctly label data.

Highly imbalanced data (e.g., malicious samples are much sparser than the benign) can impact targeted precision and recall. Various embodiments propose a solution that learns from mistakes. Specifically, assigning higher weights to the samples with prediction errors. Experiments on C2 detection, malware detection, and domain classification demonstrate that the solution results in at least 10% improvement on precision while keeping similar recall and surpasses state-of-the-art approaches.

various strategies for improving models which reduce uncertainty and shorten the path to achieving the goal are described herein. Firstly, learning from mistakes is proposed. Specifically, the prediction mistakes a ML model made on test data are identified, such as false positives and false negatives. Then error analysis is performed to figure out the root cause of the errors. In order to have a comprehensive analysis over all the prediction errors, it is important to have an error root cause report on all errors. While manually looking through all of them is time consuming, embodiments can augment the manual work with automation to find samples caused by the same error. The comprehensive deep-dive analysis provides a picture of the landscape of error root causes.

Second, working backwards from the goal. After knowing the major root causes, systems and methods can work backwards from the goal and find solutions targeted at reducing the corresponding errors. In this way, the solution is guaranteed to see improvement. In contrast, the working forward tactic gambles on whether the model performance would improve and takes much longer to achieve the goal. The work forward tactic is similar to the generate-and-test, while working backwards resembles the test-driven development, which is more efficient.

The present systems and methods for learning from mistakes to improve detection rates of Machine Learning (ML) models includes receiving data with labels, where the labels may indicate a file in the data being malicious or benign. The ML model can make a prediction for the probability that a file is malicious, where the goal of the present systems and methods is to improve this prediction.

As an example, in various embodiments, labels of data may be presented as follows.

Labels=[0, 0, 0, 0, 0, 0, 0, 0, 1, 1]

Where a 0 can indicate a file being benign, and a 1 can indicate a file being malicious. The systems and method include running the received data through an ML model to output the predictions, where the predictions can be presented as follows.

Pred_prob=[0, 0, 0, 0, 0, 0.3, 0.2, 0.8, 1, 1]

Assuming the threshold for determining a file to be malicious is 0.5, the ML model in the example has predicted 3 of the 10 files to be malicious. This includes an error since the labeled data only includes 2 malicious labeled files. In response to discovering an error in the prediction, added weights are added to the errors as shown below.

Add-on_weight=[0, 0, 0, 0, 0, 3*0.3, 3*0.2, 3*0.8, 1, 1]

The added weights are added to the errors in order to retrain the model with the new weights for better future predictions.

In various embodiments, data can have fixed weights associated with the samples (files) in the data. In these cases, the final weight is equal to the fixed weight plus the added weight previously described.

In various embodiments, upsampling can be used to artificially inflate the number of positive (malicious) samples in a dataset. Typically, data is greatly imbalanced, meaning there are much more negative (benign) samples than positive samples, or vice versa. For example, there may be 1 positive sample for every 100 negative samples. By upsampling the data, positive samples are duplicated to bring the number of positive samples closer to the number of negative samples. Thus, by upsampling, the prediction accuracy can be improved.

It will be appreciated that the present systems and methods for learning from mistakes to improve detection rates of ML models can be applied to any dataset. The present example of detecting malicious and benign files in datasets shall be construed as a non-limiting example. Additionally, the present systems and methods can be applied to multi-class labeled data, and not only the binary (i.e., 1-0) labeled data of the various examples herein.

Figure 8:
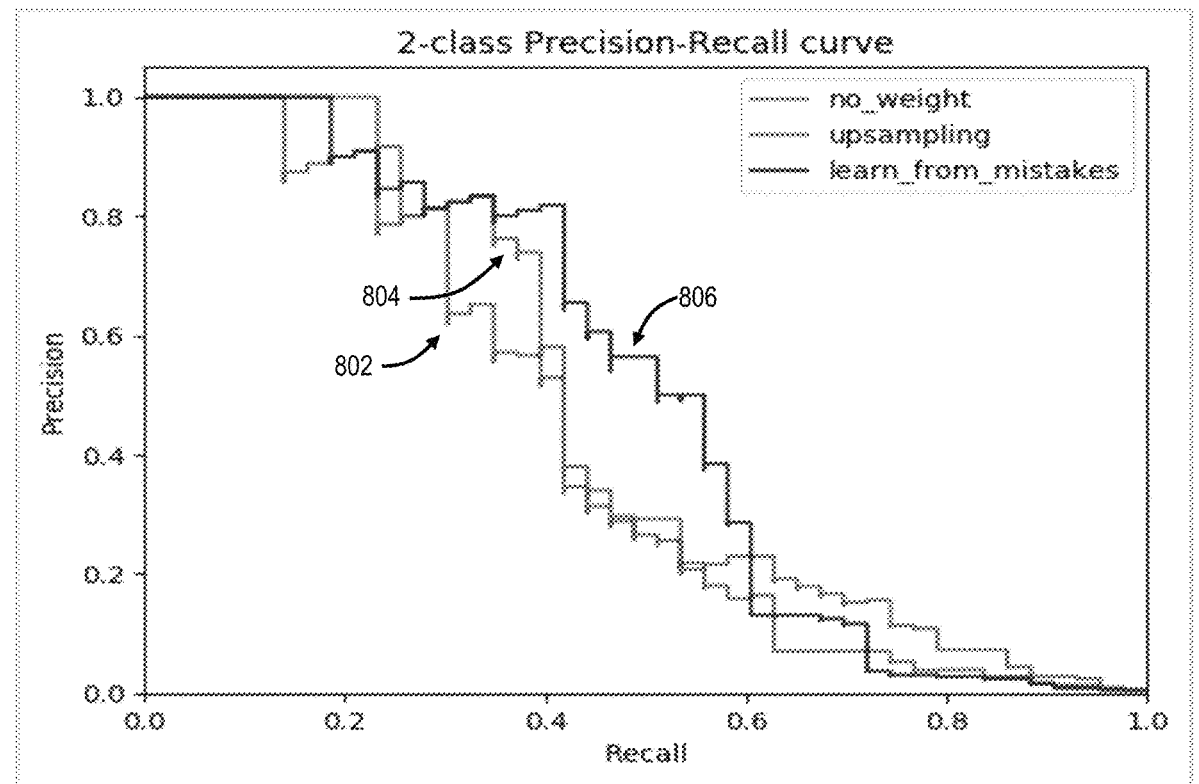
FIG. 8 is a graph showing precision-recall curves for predictions made by an ML model with no weight, upsampling, and the learning from mistakes process of the present disclosure.

FIG. 8 is a graph showing precision-recall curves for predictions made by an ML model with no weight, upsampling, and the learning from mistakes process of the present disclosure. The graph shows the precision-recall curves for an ML model trained with data including no weight (802), upsampling (804), and ML models retrained with weighted data after the learning from mistakes process of the present disclosure (806).

Figure 9:
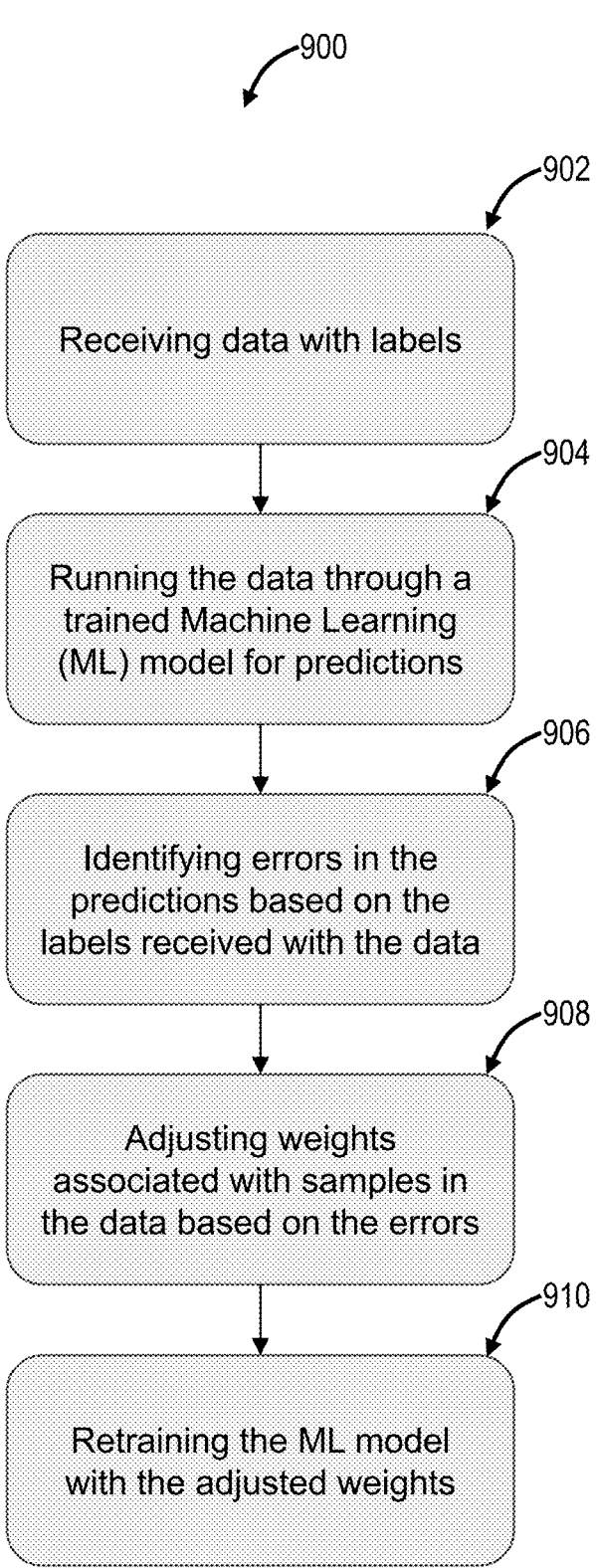
FIG. 9 is a flowchart of a process for learning from mistakes to improve detection rates of ML models.

FIG. 9 is a flowchart of a process 900 for learning from mistakes to improve detection rates of ML models. The process 900 can be performed through the cloud-based system 100. Also, the process 900 can be a computer-implemented method and as instructions stored in a non-transitory computer readable medium. The process 900 includes receiving data with labels (step 902); running the data through a trained Machine Learning (ML) model for predictions (step 904); identifying errors in the predictions based on the labels received with the data (step 906); adjusting weights associated with the data based on the errors (step 908); and retraining the ML model with the adjusted weights (step 910).

The process 900 can further include upsampling the data. The ML model can be adapted to detect malware in the received data. The labels received with the data can identify the samples in the data as malicious or benign. The received data can include fixed weights associated with samples in the data. The errors identified in the predictions can include false positives and false negatives. The received data can include highly imbalanced data. Higher weights can be added to samples in the data with prediction errors. Error analysis can be performed to figure out the root cause of the identified errors.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method for improving precision and recall (detection rates) of Machine Learning (ML) models for malware detection in a computing network environment, the method comprising steps of:

receiving data with labels identifying files, network flows, or executables as malicious or benign;

running the data through a trained ML model for predictions;

identifying errors in the predictions based on the labels received with the data, wherein the errors including false positives and false negatives;

performing error analysis to group error-causing samples by root-cause feature sets;

adjusting weights associated with samples in the data based on the identified errors, wherein adjusting comprises adding weight increments to error-causing samples and combining those increments with pre-existing fixed sample weights; and retraining the ML model with the adjusted weights to improve subsequent malware detection performance in the cloud-based system.

2. The method of claim 1, wherein the ML model is adapted to detect malware in the received data comprising executable binaries, firmware images, or network packet payloads.

3. The method of claim 1, wherein higher weights are added to the samples in the data with prediction errors, and the added weights are scaled proportionally to a confidence-score of the error or distance from decision boundary.

4. The method of claim 1, wherein the labels received with the data identify the samples in the data as malicious or benign based on static analysis, dynamic execution, sandbox results, or threat intelligence feeds.

5. The method of claim 1, wherein the received data includes fixed weights associated with the samples in the data, and wherein added weights are added to the fixed weights for the adjusting, to address class imbalance between benign and malicious samples.

6. The method of claim 1, wherein the errors identified in the predictions include false positives and false negatives, and error analysis groups errors by shared feature clusters before weight adjustment.

7. The method of claim 1, wherein the steps further include upsampling the received data to rebalance malicious and benign samples prior to retraining.

8. A cloud-based system for improving detection rates of Machine Learning (ML) models used in a computing network environment, the cloud based system comprising:

one or more processors and memory storing instructions that, when executed, cause the one or more processors to:

receive data with labels identifying files, network flows, or executables as malicious or benign;

run the data through a trained ML model for predictions;

identify errors in the predictions based on the labels received with the data, wherein the errors including false positives and false negatives;

perform error analysis to group error-causing samples root-cause feature sets;

adjust weights associated with samples in the data based on the identified errors, wherein the weights are adjusted by adding weight increments to error-causing samples and combining those increments with pre-existing fixed sample weights; and retrain the ML model with the adjusted weights to improve subsequent malware detection performance in the cloud-based system.

9. The cloud-based system of claim 8, wherein the ML model is adapted to detect malware in the received data comprising executable binaries, firmware images, or network packet payloads.

10. The cloud-based system of claim 8, wherein higher weights are added to the samples in the data with prediction errors, and the added weights are scaled proportionally to a confidence-score of the error or distance from decision boundary.

11. The cloud-based system of claim 8, wherein the labels received with the data identify the samples in the data as malicious or benign based on static analysis, dynamic execution, sandbox results, or threat intelligence feeds.

12. The cloud-based system of claim 8, wherein the received data includes fixed weights associated with the samples in the data, and wherein added weights are added to the fixed weights for the adjusted weights, to address class imbalance between benign and malicious samples.

13. The cloud-based system of claim 8, wherein the errors identified in the predictions include false positives and false negatives, and error analysis groups errors by shared feature clusters before weight adjustment.

14. The cloud-based system of claim 8, wherein the steps further include upsampling the received data to rebalance malicious and benign samples prior to retraining.

15. A non-transitory computer-readable medium comprising instructions for improving detection rates of Machine Learning (ML) models for malware detection in a computing network environment that, when executed, cause one or more processors to perform steps of:

receiving data with labels identifying files, network flows, or executables as malicious or benign;

running the data through a trained ML model for predictions;

identifying errors in the predictions based on the labels received with the data, wherein the errors including false positives and false negatives;

performing error analysis to group error-causing samples by root-cause feature sets;

adjusting weights associated with samples in the data based on the identified errors, wherein adjusting comprises adding weight increments to error-causing samples and combining those increments with pre-existing fixed sample weights; and retraining the ML model with the adjusted weights to improve subsequent malware detection performance in the cloud-based system.

16. The non-transitory computer-readable medium of claim 15, wherein the ML model is adapted to detect malware in the received data comprising executable binaries, firmware images, or network packet payloads.

17. The non-transitory computer-readable medium of claim 15, wherein higher weights are added to the samples in the data with prediction errors, and the added weights are scaled proportionally to a confidence-score of the error or distance from decision boundary.

18. The non-transitory computer-readable medium of claim 15, wherein the labels received with the data identify the samples in the data as malicious or benign based on static analysis, dynamic execution, sandbox results, or threat intelligence feeds.

19. The non-transitory computer-readable medium of claim 15, wherein the received data includes fixed weights associated with the samples in the data, and wherein added weights are added to the fixed weights for the adjusting, to address class imbalance between benign and malicious samples.

20. The non-transitory computer-readable medium of claim 15, wherein the steps further include upsampling the received data to rebalance malicious and benign samples prior to retraining.

* * * * *